US005637811A

United States Patent [19]

Simard et al.

[11] Patent Number: 5,637,811

[45] Date of Patent: Jun. 10, 1997

[54] DEVICE FOR DETECTING THE PRESENCE OF A HARD OBJECT IN AN ITEM OF MAIL

[75] Inventors: Ghislain Simard, Valence; Jean-Michel Reboul, Saint Donat, both of France

[73] Assignee: Alcatel Postal Automation Systems, Gentilly Cedex, France

[21] Appl. No.: 585,432

[22] Filed: Jan. 11, 1996

[30] Foreign Application Priority Data

Jan. 12, 1995 [FR] France ........ 95 00311

[51] Int. Cl.$^{6}$ ........ G01M 19/00

[52] U.S. Cl. ........ 73/865.8; 73/863.91

[58] Field of Search ........ 73/865.8, 866.1, 73/863.01, 863.91

[56] References Cited

U.S. PATENT DOCUMENTS

| | | | |
|---|---|---|---|
| 4,063,283 | 12/1977 | Rider et al. | 358/107 |
| 4,360,108 | 11/1982 | Logothetis | 73/37.7 |
| 4,361,029 | 11/1982 | Platter | 73/37.7 |
| 4,516,264 | 5/1985 | Covari et al. | 382/46 |
| 4,576,287 | 3/1986 | Bingham et al. | 209/601 |
| 4,687,106 | 8/1987 | Prins | 73/849 |

FOREIGN PATENT DOCUMENTS

| | | |
|---|---|---|
| 0129280A1 | 12/1984 | European Pat. Off. . |
| 1774194 | 12/1971 | Germany . |
| 854543 | 11/1960 | United Kingdom . |

*Primary Examiner*—George M. Dombroske
*Assistant Examiner*—Max H. Noori
*Attorney, Agent, or Firm*—Sughrue, Mion, Zinn, Macpeak & Seas

[57] ABSTRACT

The device comprises a conveyor (1) for displacing the envelope, in a displacement direction (D), along a path including a bend, and a member (12) disposed on the outside of the bend and downstream therefrom in said displacement direction, said member (12) cooperating with the conveyor (1) to cause the envelope to curve around the bend, and being movably mounted relative to the conveyor, so as to move a certain distance away from the conveyor depending on the thickness of the envelope and on its stiffness. A sensor (30) is provided to detect said certain distance minus the thickness of the envelope exceeding a predetermined threshold, thereby detecting that a hard object is present inside the envelope. The present invention applies to the processing of mail items.

7 Claims, 4 Drawing Sheets

DEVICE FOR DETECTING THE PRESENCE OF A HARD OBJECT IN AN ITEM OF MAIL

BACKGROUND OF THE INVENTION

The invention relates to a device for detecting the presence of a hard object inserted inside an envelope. The invention applies in particular to the automatic processing of mail items, such as postal sorting.

In the automatic processing of mail items, conveyor belts are generally used which define a relatively complicated conveyor path for the items, and which include several bends at 90° and even at 180°.

The mail items are generally constituted by flat, flexible envelopes containing sheets of paper which are themselves flexible, such that the items curve easily around the bends in the path.

However, it often happens that some processed mail items contain a hard flat object such as a key, a metal plate, or the like. Unfortunately, the presence of that type of object in a mail item is likely not only to tear the envelope of the item, but also to cause the conveyor belts either to be damaged or to be jammed, in particular at the particularly sharp, above-indicated bends in the conveyor path.

SUMMARY OF THE INVENTION

Consequently, it is useful to be able to detect mail items which contain a hard object in order to remove them from the batch of items to be processed, in order at least to avoid damaging the conveyor belts.

Furthermore, mail items are of various thicknesses which generally lie in the range 0.15 mm to 8 mm, and an object of the invention is to provide a device suitable for detecting the presence of a hard object in items of varying thickness.

To this end, the invention provides a device for detecting the presence of a hard object inserted inside an envelope having a certain thickness. The device comprises a conveyor for displacing the envelope in a displacement direction, along a path including a bend. A member is disposed on the outside of the bend and downstream therefrom in said displacement direction in order to cooperate with the conveyor to cause the envelope to curve around the bend. The member is movably mounted relative to the conveyor, so that before the envelope enters the bend, the member occupies a first position offset from the conveyor by a first distance substantially equal to the thickness of the envelope, and so that when the envelope passes into the bend the member occupies a second position offset by a certain distance from the first position. A sensor is provided to detect when said certain distance is greater than a predetermined threshold, on the basis of which it is assumed that a hard object it present inside the envelope. Since said member is initially offset from the conveyor as a function of the thickness of the envelope to be processed, it does not come violently into contact with the edge of the envelope, so the displacement of said member does not incorporate the kinetic energy which could be generated by such contact. That situation is particularly critical in a postal sorting installation where the mail items are moved very fast. A second member disposed on the outside of the bend and upstream thereof in said displacement direction is well suited for performing initial displacement of the first member disposed downstream from the bend by a distance substantially equal to the thickness of the envelope. The second member is itself preferably movably mounted relative to the conveyor and is coupled with the first member by a resilient mechanical connection suitable for absorbing any violent shocks that the second member sustains and that are transmitted to the first member. Said mechanical connection comprises in particular a telescopic connecting rod and a return spring which acts against the first member moving away from the second member. In addition, a sensor positioned to detect the relative distance between the first and second members being greater than a predetermined threshold, can act as a basis for detecting the presence of hard objects in the envelopes.

BRIEF DESCRIPTION OF THE DRAWINGS

An embodiment of the invention is described in detail below with reference to the drawings.

DETAILED DESCRIPTION OF THE PREFERRED EMBODIMENTS

The device of the invention detects the presence of a hard object such as a metal plate, inserted inside a flexible envelope made of paper or the like, such as the envelope of a mail item.

In the context of mail processing, hard objects inserted in envelopes generally have a length of at least 50 mm, a thickness of at least 1 mm and they withstand a bending force of about 400 Nmm. It is understood that this type of hard object stiffens a mail item which can thus damage or block a conveyor belt.

Figure 1:
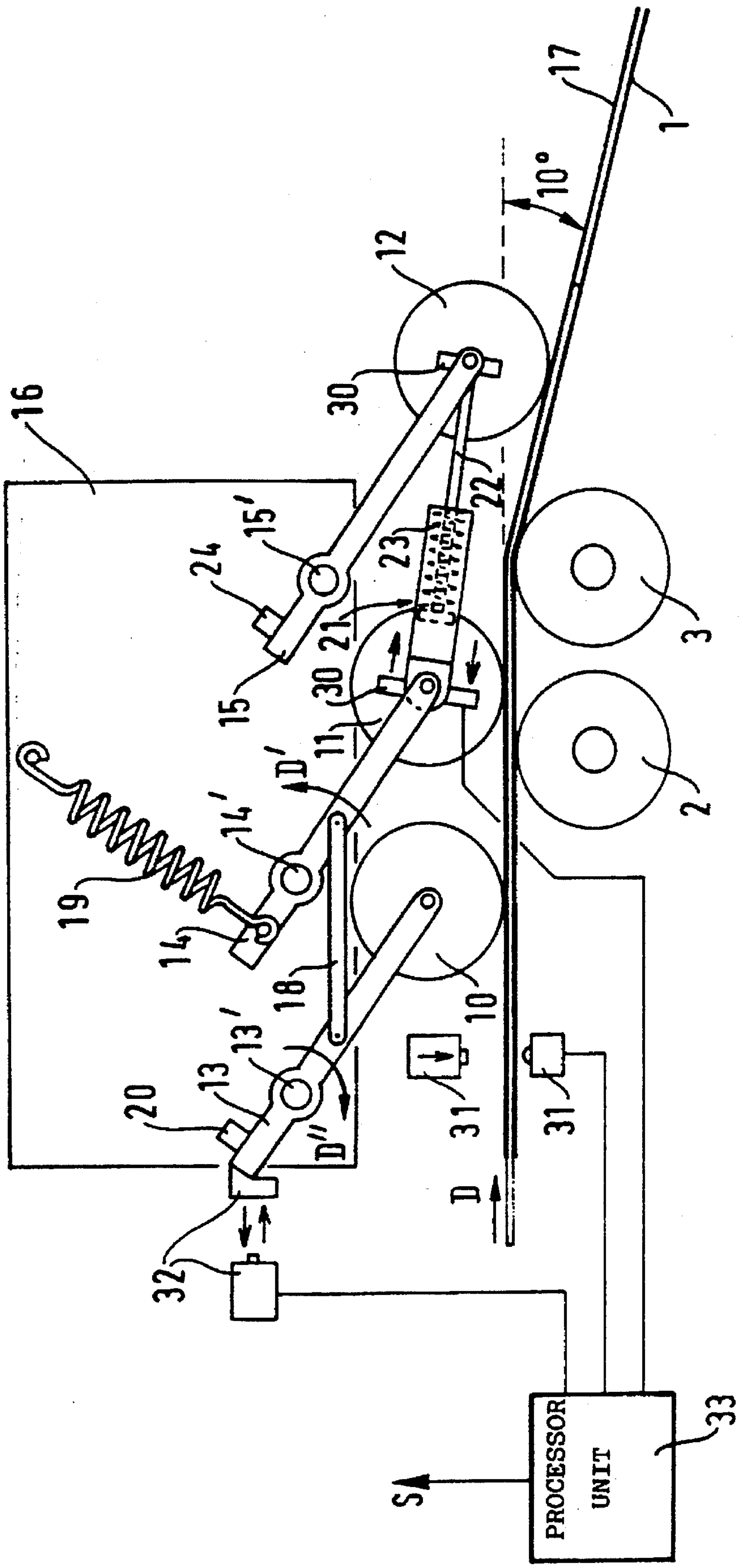
FIG. 1 is a diagram showing the device of the invention in a rest position.

In FIG. 1 a conveyor defines a rectilinear path followed by a bend through about 10°. In this case the conveyor comprises a stiff belt 1 which is engaged on two rotary rollers 2 and 3 (or pulleys) which have fixed axes of rotation. The roller 3 defines the inside of the bend. It should be understood that the conveyor belt 1 is part of a more complex mail processing installation and is found upstream of the mail processing system proper.

A set of members, such as rotary rollers, is disposed on the outside of the bend in order to cooperate with the conveyor belt 1 to cause a mail item being displaced by the conveyor in direction D, to curve around the bend, i.e. to fit round the curve of the bend.

The set of members includes three rollers 10, 11, 12 which are rotatably mounted at the ends of respective oscillating arms 13, 14, and 15. The arms 13, 14, and 15 are mounted to rotate on respective axes 13', 14', and 15' which are secured by a plate 16 adjacent to the housing of the conveyor belt 1. When in the rest position, the arms 13 to 15 are inclined at an angle of about 45° relative to the direction D, and a resilient band 17 is engaged on the rollers 10 to 12, facing the belt 1. The band 17 is held taught by other rollers which are not shown and contributes to reducing the intensity of contact between the roller 10 and an item arriving at high speed.

The arms 13 and 14 carrying the respective rollers 10 and 11 placed upstream of the bend are coupled by a connecting rod 18 which makes them oscillate together. It is noted that the axes of rotation 13' and 14' of the arms 13 and 14 respectively are in alignment parallel to the connecting rod

18 and to a rectilinear portion of the path situated upstream of the bend. Thus, when an item passes into the rectilinear portion of the path, the roller 10 moves away from the belt 1 through a distance substantially equal to the thickness of the item and the roller 11 simultaneously moves away from the belt 1 through the same distance in order to release space for the item between the belt 1 and the band 17.

A return spring 19, tensioned between the free end of the arm 14 and a lug fixed on the plate 16, acts against the movement of the arm 14 in the direction of arrow D', i.e. it acts against moving the rollers 10 and 11 away from the conveyor, and it tends to restore the rollers towards the belt 1 along arrow D". For this purpose, the return spring 19 is very lightly prestressed and an abutment 20 is placed on the plate 16 in order to limit the movement of the arm 13 along arrow D" so as to keep the rollers 10 and 11 about 1 mm away from the belt 1.

In addition, the roller 12 placed downstream from the bend and cooperating with the conveyor to cause the item to curve around said bend is coupled with the roller 11 by a resilient mechanical connection 21 comprising a telescopic connecting rod 22 having ends which are coupled to the moving axes of the rollers 11 and 12. The telescopic connecting rod is positioned to keep a minimum distance between the axes of rotation of the rollers 11 and 12, and a return spring 23, e.g. mounted inside the connecting rod, acts against elongation of the connecting rod, i.e. against the roller 11 moving away from the roller 12 under drive from a stiff item passing into the bend. Thus, when an item passing into the rectilinear portion of the path cause the roller 10 (and by reaction, the roller 11) to move away from the conveyor through a distance substantially equal to the thickness of the item, then the roller 12 is simultaneously moved away from the belt 1 of the conveyor through said same distance under drive from the connecting rod 22. An abutment 24 fixed on the plate 16 and cooperating with the arm 15 limits the travel of the roller 12 towards the belt 1 under drive from the lightly prestressed return spring 23, so as to keep the roller 12 about 3 mm away from the belt.

It should be observed that violent contact between the roller 10 and of the front edge of an item arriving in the rectilinear portion of the path is likely to cause oscillating movements of the arms 13, 14, and 15, but the oscillating movements of the arm 15 are quickly absorbed by the action of the return spring 23 whose stiffness is 3 to 4 times smaller than that of the return spring 19.

Figure 2:
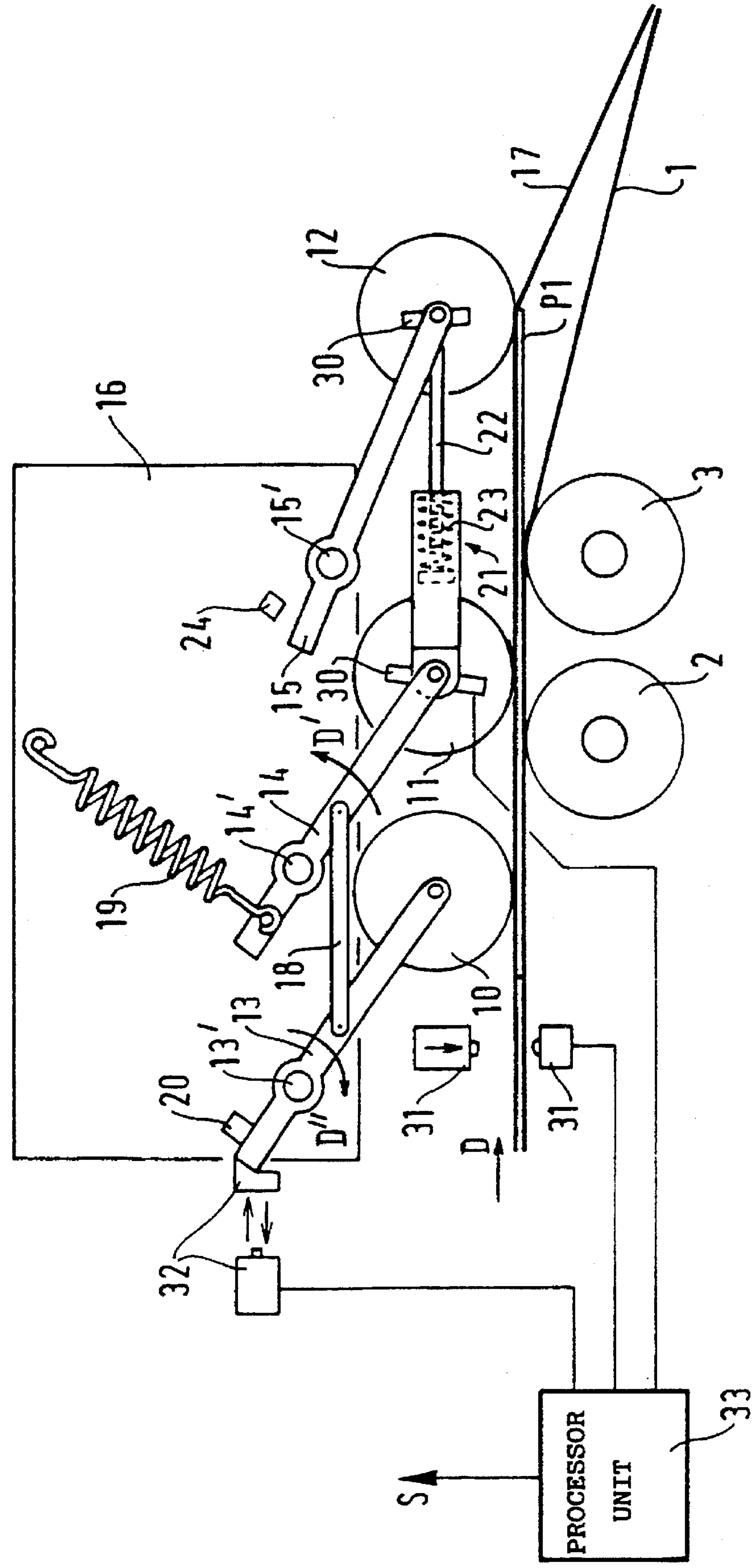
FIG. 2 is a diagram showing the device of FIG. 1, with a thin item, containing a hard object, passing therethrough.

In FIG. 1, the device occupies the rest position by the absence of an item on the path. In FIG. 2, when an item P1, which is thin but contains a hard object, arrives in the rectilinear portion of the path, the rollers 10 to 12 move away from the conveyor very little because of the thinness of the item P1. When the item P1 arrives in the bend, the rollers 10 and 11 still bear on the rear part of the item which is now parallel to the rectilinear portion of the path, whilst the roller 12 progressively moves away from the conveyor because it is pushed by the hard object inside the item and because the return spring 23 is not as stiff as the return spring 19.

Figure 3:
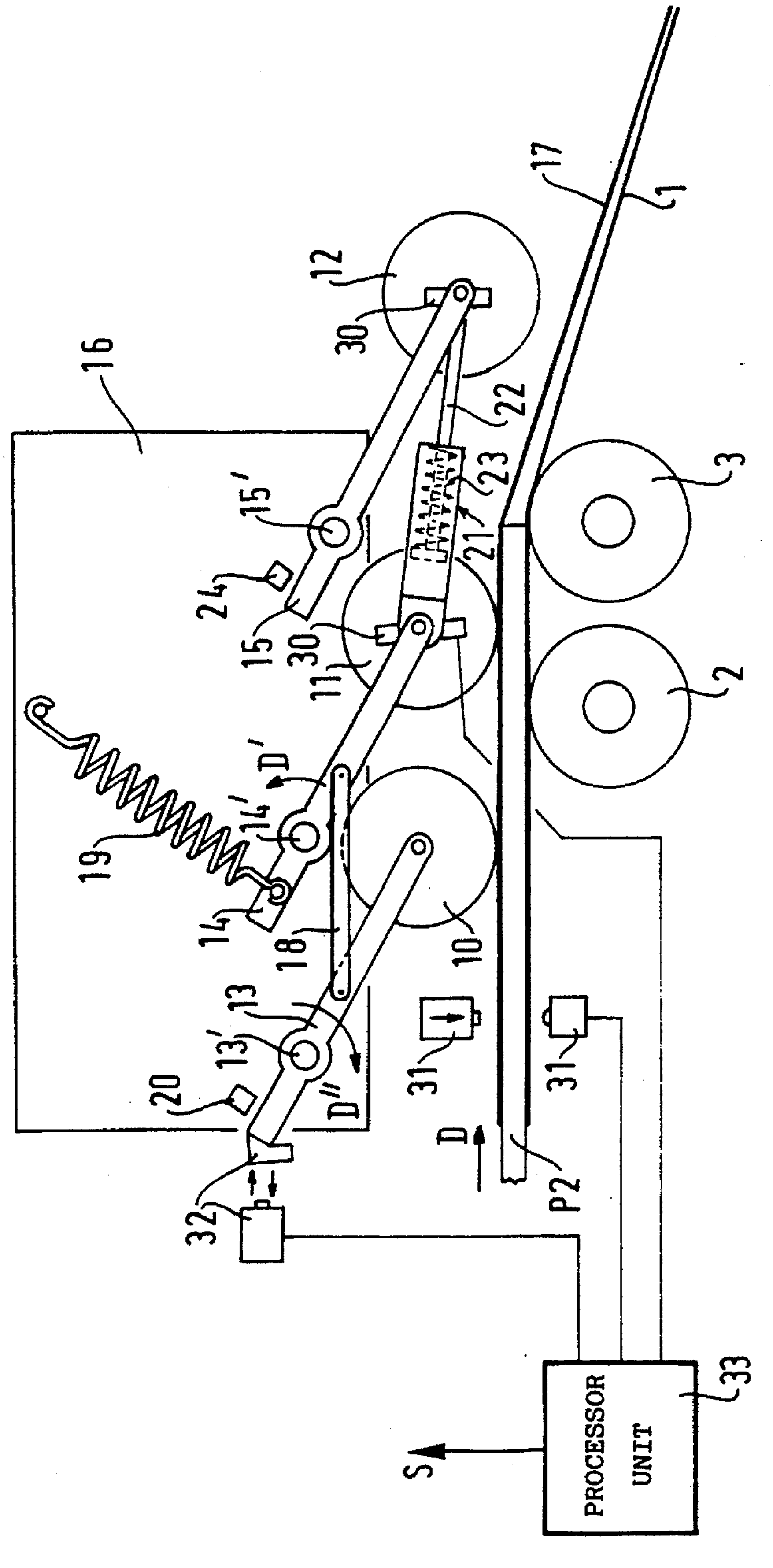
FIG. 3 is a diagram showing the device of FIG. 1, with a thick item passing therethrough.

In FIG. 3, when a thick item P2 arrives in the rectilinear portion of the path, the rollers 10 to 12 move away from the conveyor through a distance substantially equal to the thickness of the item P2. When the item P2 arrives in the bend, either its stiffness is insufficient to move the roller 12 further away from the conveyor, in which case the presence of a hard object inside the item P2 is undetected, or else its stiffness is sufficient to move the roller 12 further away from the conveyor and in which case said item is detected as containing a hard object.

Consequently, the roller 12 occupies substantially the same position between the instant when a flexible item reaches the bend and the instant when said flexible item passes into the bend regardless of its thickness. However, the roller occupies different positions between the instant when a stiff item reaches the bend and the instant when said stiff item passes into the bend. It is the change in the position of the roller between said two instants that acts as the basis for detecting the presence of a hard object in an item subjected to a bending force by said roller. If the roller 12 changes position between said two instants, then the relative distance between the rollers 11 and 12 also changes.

In the invention, a sensor is provided in order to detect displacement of the roller 12 between the position that it occupies before the item reaches the bend and the position that it occupies at the moment when the item passes into the bend. If the distance between said two positions is greater than a predetermined threshold which is fixed for example at 2 mm, then the presence of a hard object in the item is detected.

In a preferred embodiment of the invention, the sensor is mounted on the rollers 11 and 12 in order to detect the relative distance between the rollers 11 and 12 being greater than the predetermined threshold, thereby detecting the presence of a hard object in the analyzed item. Such a sensor is constituted, for example, by a transmitter-receiver photodetector cell 30 placed on the axis of rotation of the roller 11 and operating in on/off mode in association with a reflector placed on the axis of rotation of the roller 12. In a variant, the sensor is constituted by a photodetector fork cell placed on the axis of the roller 11 and operating in on/off mode with a flag placed on the axis of the roller 12.

To accommodate various different situations, e.g. a hard object in a thin item, a hard object in a thick item, or a hard object placed at the front, in the middle, or at the rear of the item, a position sensor 31 of the photodetector type is placed at a point on the rectilinear portion of the path in order to detect both the leading and trailing edge of the item as they pass by. Another sensor 32 is provided in order to detect when the thickness of the item is greater than a predetermined threshold, for example 5 mm (for a thick item). For example, the sensor 32 is a transmitter-receiver photodetector cell placed on the plate 4 and operating in on/off mode with a reflector mounted on the end of the arm 13.

The outputs from the sensors 30, 31, and 32 are fed into a data processing unit 33 which, as a function of the outputs from said sensors, provides a signal S indicating whether a hard object is present in the analyzed item.

Figure 4:
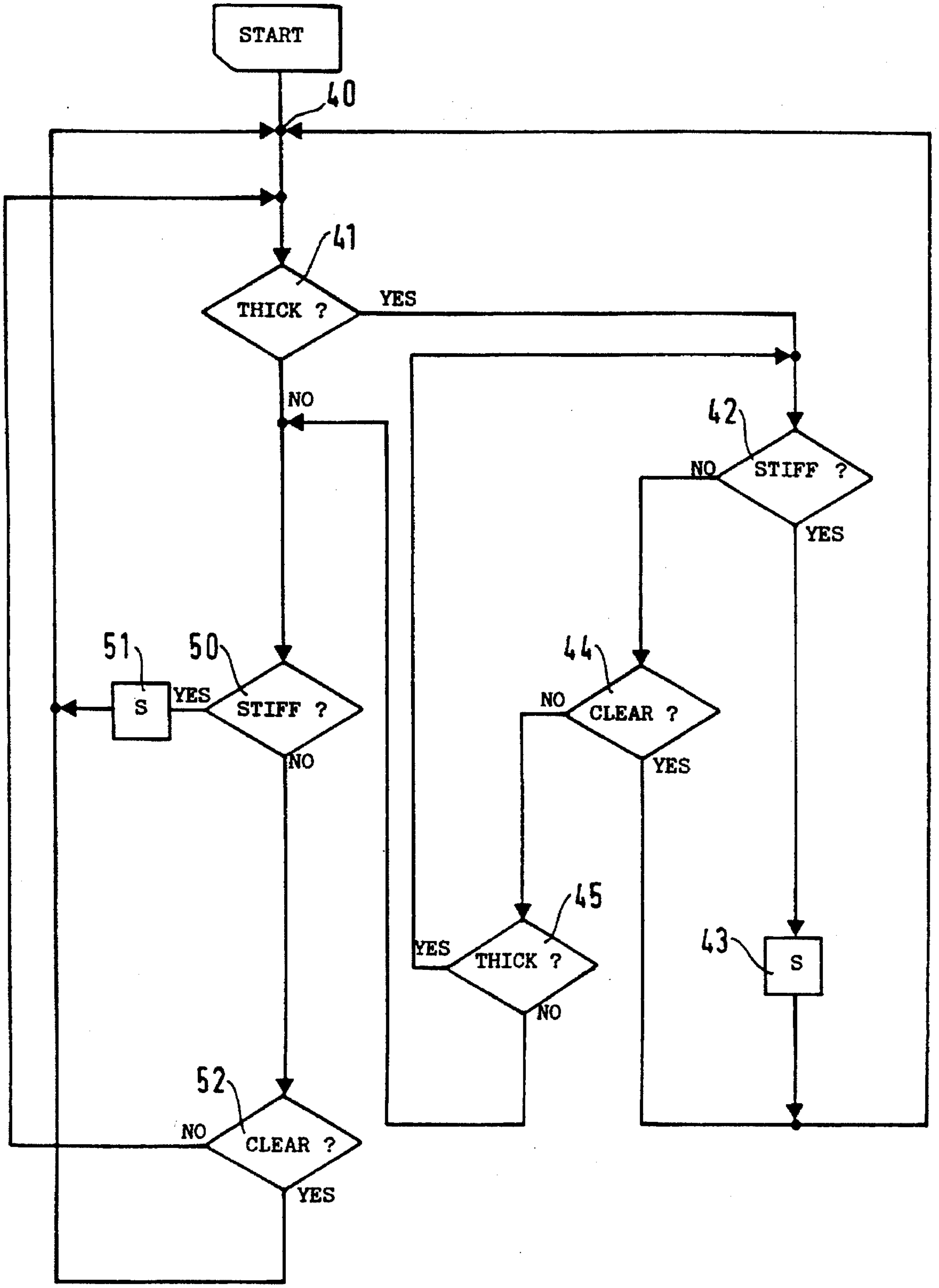
FIG. 4 is a flowchart showing the operation of the device of the invention.

In FIG. 4, the operation of the unit 4 [33] is shown by a flowchart.

At 40, the front edge of an item passing under the roller 11 is detected in response to the output of the sensor 31, following which, at 41, the output of the sensor 32 is tested. If the sensor 32 detects the presence of a thick item processing moves on to 42. Otherwise, the output of the sensor 30 is tested at 50. It should be observed that at this instant the item is in the bend. If the sensor 30 detects the presence of a stiff item, the processing unit produces a signal S at 51 which indicates the presence of a hard object in the item which is leaving the bend. Otherwise, processing continues to step 52. At 52, if the rear edge of the item passing under the roller 12 is detected in response to the output of the sensor 31, the processing unit does not produce a signal S indicative of the presence of a hard object in the item which is leaving the bend, and the process loops back to step 40 whilst waiting for a new item to pass under the roller 11. Otherwise, the process loops back to the test step 41. It should thus be observed that the presence of a hard object situated in the rear, the middle, or even the front part of a thin item is detected by the processing unit.

At the input of step 42, a thick item has been detected by the sensor 32. At 42, the output of the sensor 30 is tested. If the sensor 30 detects the presence of a stiff item, the processing unit provides a signal S at 43 which indicates the presence of a hard object in the item. In which case, it should be observed that it is possible for the thick and stiff item not to contain a hard object. If the sensor 30 does not detect the presence of a stiff item at 42, the output of the sensor 31 is tested at 44. At 44, if the rear edge of the item passing under the roller 11 is detected, the process loops back to step 40. It should be observed that this case corresponds to detecting a thick item that is flexible. Otherwise, the output from the sensor 32 is tested at 45, while the item is in the bend. If the sensor 32 still detects the presence of a thick item, the process loops back to the test step 42 to detect a hard object, if any, situated at the rear of the thick item. Otherwise, the process loops back to step 50. In this case, it concerns an item of varying thickness which may contain a hard object in its rear part. It should be observed that the signal S can act as a control signal to a switching system placed after the bend which reroutes each item that is detected as containing a hard object towards a storage area, for example.

What is claimed is:

1. A device for detecting the presence of a hard object inserted inside an envelope (P1, P2) having a certain thickness, the device comprising: a conveyor (1) for displacing the envelope in a displacement direction (D), along a path including a bend; a member (12) disposed on the outside of the bend and downstream therefrom in said displacement direction in order to cooperate with the conveyor to cause the envelope to curve around the bend, said member being movably mounted relative to the conveyor, so that before the envelope enters the bend, the member occupies a first position offset from the conveyor by a first distance substantially equal to the thickness of the envelope, and so that when the envelope passes into the bend the member occupies a second position offset by a certain distance from the first position; and a sensor (30) to detect when said certain distance is greater than a predetermined threshold, thereby detecting that a hard object is present inside the envelope.

2. The device according to claim 1, comprising a second member (11) disposed on the outside of the bend and upstream thereof in said displacement direction, said second member (11) being movably mounted relative to the conveyor and being coupled with the first member disposed downstream from the bend, in such a manner as to be displaced, under drive from the envelope reaching the bend, through a distance substantially equal to the thickness of the envelope, and to transmit its displacement movement to said first member in order to displace said first member towards its first position.

3. The device according to claim 2, in which the first member (12) and the second member (11) are coupled together by a resilient mechanical connection (21).

4. The device according to claim 3, in which the resilient mechanical connection (21) comprises a telescopic connecting rod (22) and a return spring (23) which acts against the first member moving away from the second member.

5. The device according to claim 2, in which the sensor (30) is positioned to detect the relative distance between the first and second members being greater than said predetermined threshold.

6. The device according to claim 2, in which said first member (12) and said second member (11) are rotary rollers on which a resilient band (17) is engaged.

7. The device according to claim 2, comprising: a first sensor (30) for detecting that the relative distance between the first member (12) and the second member (11) is greater than a first predetermined threshold; a second sensor (32) for detecting that the thickness of the envelope is greater than a second predetermined threshold; a third sensor (31) for detecting the passage of an envelope upstream of the bend in the displacement direction; and a data processing unit (33) which provides a signal (S) indicative of the presence of a hard object inside the envelope in response to the outputs from said first, second and third sensors.

* * * * *